United States Patent Office 3,410,883
Patented Nov. 12, 1968

3,410,883
TETRAMETALLOCENE METAL COMPOUNDS AND PREPARATION
Harold Rosenberg, Dayton, Ohio, assignor to the United States of America as represented by the Secretary of the Air Force
No Drawing. Filed Sept. 1, 1966, Ser. No. 577,120
10 Claims. (Cl. 260—429)

ABSTRACT OF THE DISCLOSURE

Tetraferrocenyl componuds useful in compounds requiring resistance to oxidation and radiant energy degradation having the formula $(C_5H_5FeC_5H_4)_4M$ where M is a Group IV metal of the class consisting of Si, Ge, Sn, Sb, Pb, Hf, Zr and Ti. These compounds are made by reacting ferrocenyllithium with a halide from the above Group IV metals in a solvent medium.

---

This invention relates to a series of new compositions wherein four metallocene nuclei are bonded to a single metal or metalloid atom and to the synthesis and preparation of such compositions. More specifically the invention relates to the tetraferrocenyl derivatives of the metals of Group IV of the Mendeleevian Periodic Table of Elements. Reference herein to metals of Group IV is meant to include not only the true metals but also silicon which is a metalloid.

Although numerous substituted ferrocenes have been synthesized, very little is known to the prior art concerning ferrocenyl organometallic or organometalloidal compounds and especially those containing Group IV metals. In those few instances wherein a ferrocenyl organometallic has been suggested, only one or two ferrocenyl nuclei or moieties have been associated with the metal atom, and the remainder of the metal's valences in a stable compound have been satisfied by bonds with other elements or radicals, such as alkyl or phenyl groups. On the other hand, while the valences of other elements, notably phosphorus, have been completely satisfied by ferrocenyl moieties, the methods and procedures by which such compounds have been synthesized, have been incapable of providing a derivative of a Group IV element which is fully substituted by metallocenyl nuclei.

One very important result of these limitations and deficiencies of the prior art relating to ferrocenyl organometallic or organometalloidal compounds has been its inability to provide a ferrocene-containing substance which exhibits the desirable properties of ferrocene such as anti-oxidant capability and a unique resistance to degradation under exposure to radiant energy, particularly in the ultraviolet range. Moreover, the prior art ferrocenyl compounds have been characterized by a relatively low melting point and thermal instability to the extent that, even though they could achieve the desired properties normally associated with pure ferrocene, they would not make such properties available in high-temperature environments of the type being encountered with ever-increasing frequency in such applications as high-speed aircraft, rocket engines, aerospace vehicles and the like.

In addition to the foregoing, development of ferrocenyl compounds prior to the present invention has been such as to indicate that they can be obtained only in disappointingly small yields with little or no economies of time and materials.

It is accordingly an object of the present invention to provide metallocenyl organometallic and organometalloidal compounds as new compositions of matter.

A more specific object of the present invention is to provide as a new series of compositions of matter compounds comprising four metallocene nuclei bonded to a single metal atom, especially to a Group IV metal atom.

Yet another object of the present invention is to provide a ferrocenyl organometallic or organometalloidal compound which will exhibit the desired properties and characteristics normally associated with ferrocene.

Yet another object of the invention of primary importance to the advancement of the art is the provision of ferrocenyl compounds exhibiting the properties of ferrocene which will be further characterized by high thermal stability.

Still another object of the invention is the provision of high melting, high-temperature-resistant tetraferrocenyl derivatives of the Group IV metals in yields higher than those that have been heretofore obtained in ferrocenyl organometallic or organometalloidal compounds.

To achieve these and other objects and advantages which will be apparent from a reading of the following disclosure, the present invention teaches the new series of tetraferrocenyl derivatives of the Group IV elements according to the formula $(C_5H_5FeC_5H_4)_4M$ wherein M is a Group IV metal such as germanium, tin, lead, titanium, zirconium and hafnium or the metalloid, silicon. Such compounds are prepared according to this invention by the reaction of ferrocenyllithium with a halide of the appropriate metal in solution in tetrahydrofuran, in tetrahydrofuran-ether or tetrahydrofuran-hexane according to the following equation:

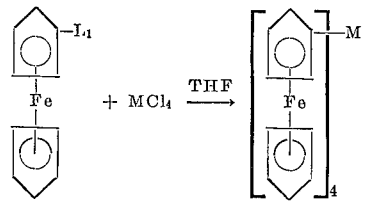

While the above reaction has produced the desired compounds in satisfactory yields as to all of the Group IV metals, it has produced particularly high yields of the tetraferrocenyl derivatives of silicon, germanium and tin; and the tetraferrocenyl silanes and tetraferrocenylgermanes have exhibited thermal stability to such an extent that it is not completely inaccurate to state that their thermal stability is among the highest of all known organometallic compounds. This however is not to detract from the substantial improvements in thermal stability which are achieved in the tetraferrocenyl derivatives of the other Group IV metals.

In the case of the preparation of the tetraferrocenyllead and the tetraferrocenyltin, a modification of the method of synthesis has been found workable and, particularly in the case of tetraferocenyllead, has been found capable of producing the derivative in much higher yield than is obtainable by the above-described method which is generally applicable to all of the Group IV metals. In this particular modification the dichloride of the metal such as lead or tin is reacted with an excess of the ferrocenyllithium in a tetrahydrofuran solution to form hexaferrocenyldilead or hexaferrocenylditin which is then subjected to thermal decomposition to produce the tetraferrocenyllead plus elemental lead or tetraferrocenyltin plus tin.

The ferrocenyl derivatives thus obtained are all very high melting solids which exhibit surface decomposition at temperatures approaching their melting point. In the manner of their phenyl analogs, the tetraferrocenyl metals decrease in melting point with an increase in the weight of the metal atom. They are relatively soluble in aromatic and halogenated organic solvents and almost insoluble in saturated hydrocarbons and alcohols. These compounds are all colored, varying from light yellow in the case of tetraferrocenylsilane to red orange in the case of tetraferrocenyllead and are relatively stable to light and hydrolysis by acids and bases. Their infrared spectra show the usual absorptions associated with ferrocene compounds as well as several additional bands. The spectrum of the silane derivatives has three peaks between 7.2 and 7.4 microns while the spectra of the other members of the series have a stronger absorption at 7.25 microns and only a weak shoulder in place of the other two peaks.

The general method for the preparation of the series of tetraferrocenylmetal or tetraferrocenylmetalloidal compounds is characterized by the synthesis of tetraferrocenylgermane as follows. To a cooled solution containing 51.7 millimoles of ferrocenyllithium in tetrahydrofuran-hexan is slowly added 2.14 grams (10 millimoles) of germanium tetrachloride in 90 milliliters of tetrahydrofuran. This mixture is refluxed with stirring for 17 hours and the solution is then concentrated in vacuo to a volume of 40 milliliters whereupon 500 milliliters of 95% ethanol are added. After warming the solution for 15 minutes, the mixture is chilled and filtered to yield on the order of 5.2 grams of a yellow solid with a melting point of from 260° to 292° centigrade. Chromatography of such a product using methylene chloride as the eluting agent yields 3.45 grams (42.5%) of the tetraferrocenylgermane as fine yellow needles with a melting point of from 290° to 294° centigrade. Recrystallization from dioxane:hexane will then yield coarse orange needles with a melting point of from 293° to 294° centigrade.

As indicated, this same general procedure utilizing the same molar relationships between the ferrocenyllithium and the metal or metalloidal tetrachloride in the tetrahydrofuran may be employed to provide the other tetraferrocenyl derivatives of the series. Thus, where the germanium tetrachloride, in the above example, is replaced with silicon tetrachloride, the tetraferrocenylsilane will be obtained. So, also the substitution for the germanium tetrachloride of tin tetrachloride, lead tetrachloride, hafnium tetrachloride, zirconium tetrachloride and titanium tetrachloride will yield respectively tetraferrocenyltin, tetraferrocenyllead, tetraferrocenylhafnium, tetraferrocenylzirconium and tetraferrocenyltitanium. The high temperature properties of this series of compounds are exemplified by the tetraferrocenylsilane $$(C_{40}H_{36}SiFe)$$

which exhibits a melting point of from 292° to 294° centigrade or by the tetraferrocenyltin $(C_{40}H_{36}SnFe)$ which has a melting point of from 275° to 276° centigrade. Tetraferrocenyllead 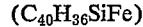 produced according to this general procedure has good high temperature properties as indicated by its melting point ranging from 287° to 289° centigrade, but its yield is low.

As indicated above however, the production of the tetraferrocenyllead in higher percentage yields was found to be possible by using lead dichloride to provide a hexaferrocenyldilead which could then be thermally decomposed according to the following method. To a cooled tetrahydrofuran-ether solution containing 48 millimoles of ferrocenyllithium is slowly added with vigorous stirring a slurry of 5.56 grams (20 millimoles) of lead dichloride in 50 milliliters of tetrahydrofuran. The mixture is then stirred for 17 hours at reflux. A 185-milliliter portion of the 395 milliliters of the reaction mixture is then concentrated in vacuo, extracted with methanol and filtered to obtain 2.0 grams of a residue exhibiting a melting point of from 222° to 250° centigrade. When this residue is eluted from alumina in a chromatographic tube with methylene chloride, there is provided 0.45 gram of the tetraferrocenyllead exhibiting a melting point of from 287° to 289° centigrade.

All of the above compounds exhibit many of the properties of ferrocene and the long sought, but hitherto unobtainable, stability at high temperatures of the order of 300° centigrade and upward. Using differential thermal analysis the tetraferrocenylsilane, for example, has been heated at a steady rate of the order of 20° centigrade per minute from room temperature (27° centigrade) to 475° centigrade without any noticable decline in its physical stability, except for a routine endopeak at about 293° centigrade corresponding to its melting point. While the tetraferrocenylgermane and the tin and the lead derivatives are slightly less stable upon high-temperature exposures, they do exhibit substantially improved thermal stability over other ferrocenyl compounds that have been heretofore known to the art, and all suffer no substantial losses in dimensional or other physical characteristics upon prolonged exposures to temperatures as high as 300° centigrade. Moreover, all of these derivatives continue to exhibit the high antioxidative and ultraviolet radiation resistant properties that are associated with ferrocene through high heat energy environments up to the point at which they become unstable. As a result, these materials are useful as high-temperature additives for example, as grease thickeners, anti-oxidants in certain materials such as the rubbers and synthetic rubbers, oils, fluids and the like, thereby making possible in such substances the desirable properties that have heretofore been associated with ferrocenes but have not been obtainable in high temperature applications. Additionally, these compounds and particularly tetraferrocenyllead demonstrate piezoelectrical activity and are useful in piezoelectrical devices.

While the present invention has been described in considerable detail in connection with specific embodiments and examples, it is to be understood that the particularization has been for the purposes of illustration only and does not limit the breadth or scope of the invention as it is more precisely defined in the subjoined claims.

I claim:

1. As new compositions of matter, tetraferrocenyl compounds according to the formula $(C_5H_5FeC_5H_4)_4M$ where M is an element of Group IV of the Periodic Table selected from the class consisting of Si, Ge, Sn, Pb, Hf, Zr and Ti.

2. A composition of matter according to claim 1 wherein M is one of that class of materials which consists of silicon, germanium, tin and lead.

3. As a new composition of matter, tetraferrocenylsilane.

4. As a new composition of matter, tetraferrocenylgermane.

5. As a new composition of matter, tetraferrocenyltin.

6. As a new composition of matter, tetraferrocenyllead.

7. A method for the synthesis of a tetraferrocenyl derivative of a Group IV metal comprising reacting ferrocenyllithium with the halide of the Group IV metal in that class of solvents which consists of tetrahydrofuran, tetrahydrofuran-ether and tetrahydrofuran-hexane.

8. A method for the synthesis of tetraferrocenyl derivatives of that class of metals which consists of silicon, germanium, tin and lead comprising reacting an excess of ferrocenyllthium with the tetrachloride of the particular metal in a solvent from that class which consists of tetrahydrofuran, tetrahydrofuran-ether and tetrahydrofuran-hexane.

9. A method for the synthesis of tetraferrocenyllead comprising reacting lead dichloride with ferrocenyllithium in that class of solvents which consists of tetrahydrofuran, tetrahydrofuran-ether and tetrahydrofuran-hexane to form hexaferrocenyldilead and thermally decomposing the hexaferrocenyldilead.

10. A method for the synthesis of tetraferrocenyltin comprising reacting tin dichloride with ferrocenyllithium in tetrahydrofuran to form hexaferrocenylditin and subjecting it to thermal decomposition.

No references cited.

TOBIAS E. LEVOW, *Primary Examiner.*

A. P. DEMERS, *Assistant Examiner.*